United States Patent
Pachciarz et al.

(12) 
(10) Patent No.: US 6,435,365 B2
(45) Date of Patent: *Aug. 20, 2002

(54) SEAL ASSEMBLY FOR A FUEL TANK

(75) Inventors: Mahlon Richard Pachciarz, Grand Blanc; Gary Francis Stack, Fenton, both of MI (US)

(73) Assignee: Delphi Technologies, Inc., Troy, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/418,617

(22) Filed: Oct. 15, 1999

Related U.S. Application Data

(60) Provisional application No. 60/138,062, filed on Jun. 8, 1999.

(51) Int. Cl.[7] .................................................. B65D 6/00
(52) U.S. Cl. ...................... 220/4.14; 123/518; 220/328; 220/562; 277/651; 280/834
(58) Field of Search ................................ 277/640, 651, 277/630, 922; 220/327, 328, 378, 562, 622, 4.14, 601, 905, 661; 123/518; 280/830, 834

(56) References Cited

U.S. PATENT DOCUMENTS

| | | | | |
|---|---|---|---|---|
| 1,278,133 A | * | 9/1918 | Gammeter | 244/99 |
| 2,366,442 A | * | 1/1945 | Cunningham | 285/200 |
| 2,457,066 A | * | 12/1948 | Pepersack | 220/327 |
| 2,532,328 A | * | 12/1950 | Penning | 222/426 |
| 3,047,703 A | * | 7/1962 | Aske | 220/378 |
| 4,067,531 A | * | 1/1978 | Sikula | 220/378 |
| RE29,532 E | * | 2/1978 | Zwick | 52/140 |
| 4,919,103 A | * | 4/1990 | Ishiguro et al. | 123/514 |
| 5,067,575 A | * | 11/1991 | Hyde et al. | 220/4.14 |
| 5,165,189 A | * | 11/1992 | Besal | 49/463 |
| 5,313,978 A | * | 5/1994 | Takaki et al. | 137/43 |
| 5,366,318 A | * | 11/1994 | Brancher | 405/36 |
| 5,680,848 A | * | 10/1997 | Katoh et al. | 123/518 |
| 5,810,400 A | * | 9/1998 | Youngs | 285/139.1 |
| 5,833,392 A | * | 11/1998 | Youngs | 405/53 |
| 5,901,689 A | * | 5/1999 | Kimura et al. | 123/518 |

* cited by examiner

*Primary Examiner*—Stephen K. Cronin
*Assistant Examiner*—Joseph C. Merek
(74) *Attorney, Agent, or Firm*—Vincent A. Cichosz

(57) ABSTRACT

A seal assembly for a fuel tank having a tank opening and a component disposed therein includes a seal adapted to be disposed between the component and a tank surface of the fuel tank. The seal assembly also includes an encapsulated studded ring assembly for attachment to the tank surface and adapted to be disposed about the tank opening. The seal assembly further includes a locking ring cooperating with the encapsulated studded ring assembly for engagement with the component to secure the component to the fuel tank and to seal the tank opening via the seal.

20 Claims, 3 Drawing Sheets

SEAL ASSEMBLY FOR A FUEL TANK

CROSS-REFERENCE TO RELATED APPLICATION(S)

The present invention claims the priority date of copending U.S. Provisional Patent Application Serial No. 60/138,062, filed Jun. 8, 1999.

TECHNICAL FIELD

The present invention relates generally to fuel tanks for vehicles and, more particularly, to a seal assembly for a fuel tank of a vehicle.

BACKGROUND OF THE INVENTION

It is known to provide a fuel tank such as a plastic fuel tank in a vehicle to hold fuel to be used by an engine of the vehicle. Typically, the fuel tank has a tank opening and a unit installed into the tank via the tank opening that requires a seal with the tank. In some vehicles, an insert molded locking ring is used to attach a locking mechanism and gasket to close/seal the tank opening.

It is desirable to form the plastic fuel tank using a thermoform process. However, thermoforming is not conducive to insert molding of this locking ring.

Additionally, some plastic fuel tanks are manufactured utilizing blow-molding techniques. During blow molding, the plastic fuel tanks incorporate an encapsulated insert molded locking mechanism or mold in a Mason jar style thread with the gasket sealing on the tank. This required welding an encapsulated locking mechanization to the tank. If the weld is not one hundred percent, there is a potential for fuel or emission leakage over time.

Although the above seal has worked, it is desirable to provide a seal assembly for a fuel tank in a vehicle that is more robust. It is also desirable to provide a seal assembly for a fuel tank in a vehicle that eliminates a potential leak path of a welded component. It is further desirable to provide a seal assembly for a fuel tank in a vehicle that is formed by a thermoforming process.

SUMMARY OF THE INVENTION

It is, therefore, one object of the present invention to provide a new seal assembly for a fuel tank in a vehicle.

It is another object of the present invention to provide a seal assembly for a fuel tank in a vehicle that eliminates potential leak paths through an incomplete weld.

It is yet another object of the present invention to provide a seal assembly for a fuel tank in a vehicle that is more robust.

To achieve the foregoing objects, the present invention is a seal assembly for a fuel tank having a tank opening and a component disposed therein includes a seal adapted to be disposed between the component and a tank surface of the fuel tank. The seal assembly also includes an encapsulated studded ring assembly for attachment to the tank surface and adapted to be disposed about the tank opening. The seal assembly further includes a locking ring cooperating with the encapsulated studded ring assembly for engagement with the component to secure the component to the fuel tank and to seal the tank opening via the seal.

One advantage of the present invention is that a new seal assembly is provided for a fuel tank in a vehicle. Another advantage of the present invention is that the seal assembly eliminates a potential leak path of a welded component by sealing on an area that is independent of that leak path process and components. Yet another advantage of the present invention is that the seal assembly provides a robust means of thermoformed tanks to assure that the seal of a unit installed into the tank is complete, eliminating the concerns for potential leaks paths through an incomplete weld. Still another advantage of the present invention is that the seal assembly increases the robustness of the seal by utilizing a gasket and sealing beyond the weld directly on the tank surface. A further advantage of the present invention is that the seal assembly includes a studded ring encapsulated in plastic and welded to the tank. Yet a further advantage of the present invention is that the seal assembly is used with a thermoformed plastic fuel tank.

Other objects, features and advantages of the present invention will be readily appreciated, as the same becomes better understood after reading the subsequent description taken in conjunction with the accompanying drawings.

DESCRIPTION OF THE PREFERRED EMBODIMENT

Figure 1:
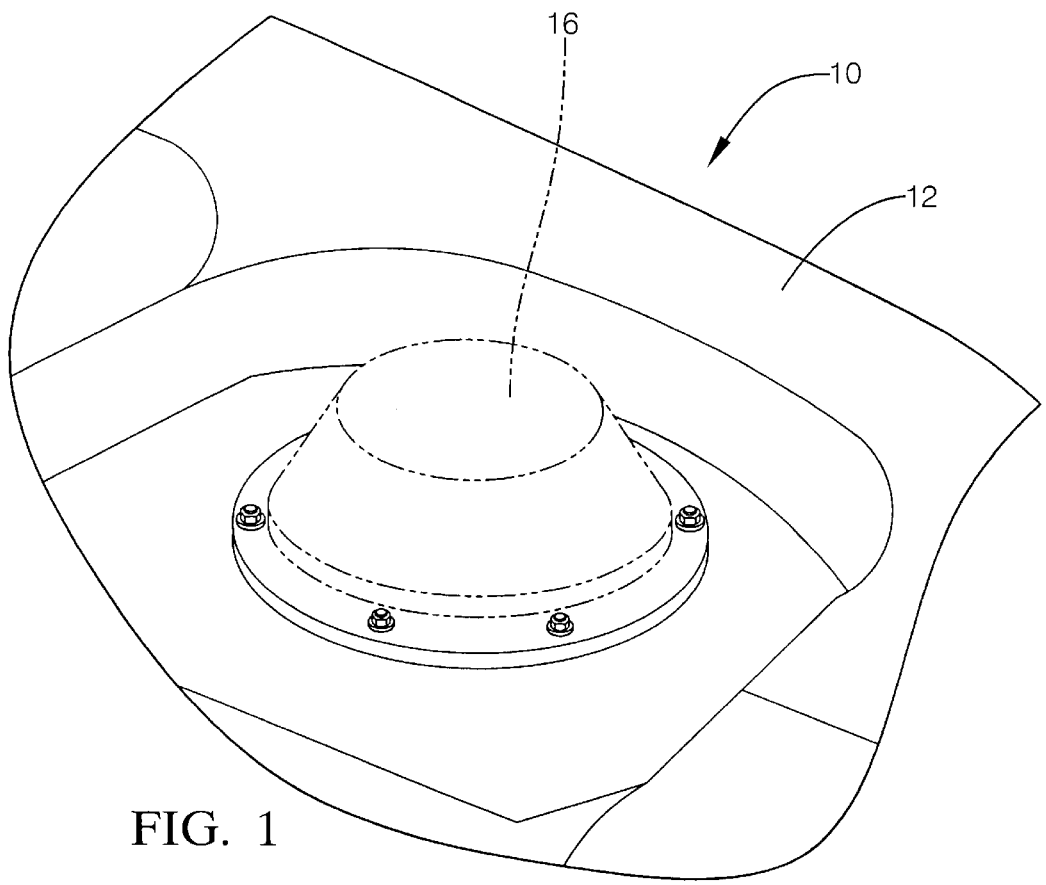
FIG. 1 is a perspective view of a seal assembly, according to the present invention, illustrated in operational relationship with a fuel tank of a vehicle.
Figure 2:
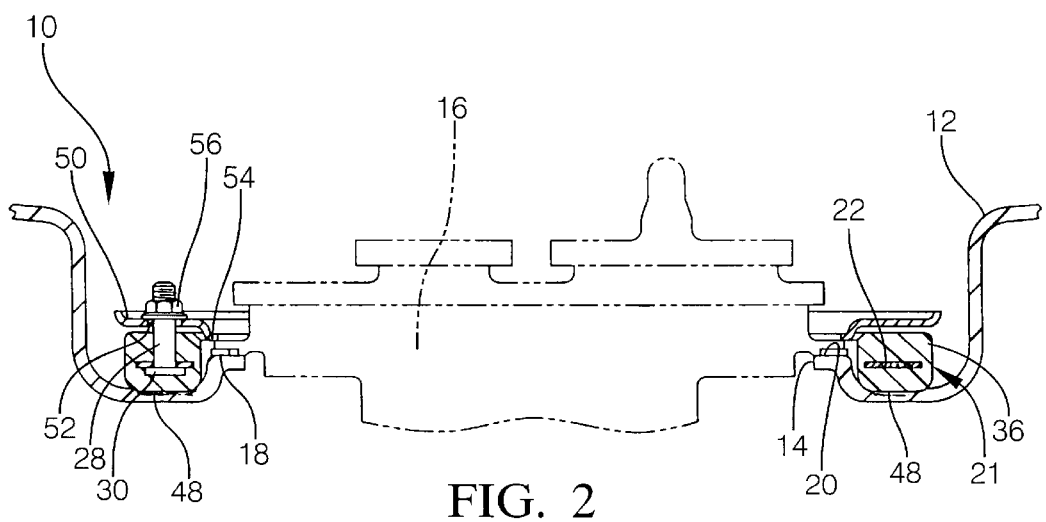
FIG. 2 is an enlarged fragmentary elevational view of the seal assembly of FIG. 1.
Figure 3:
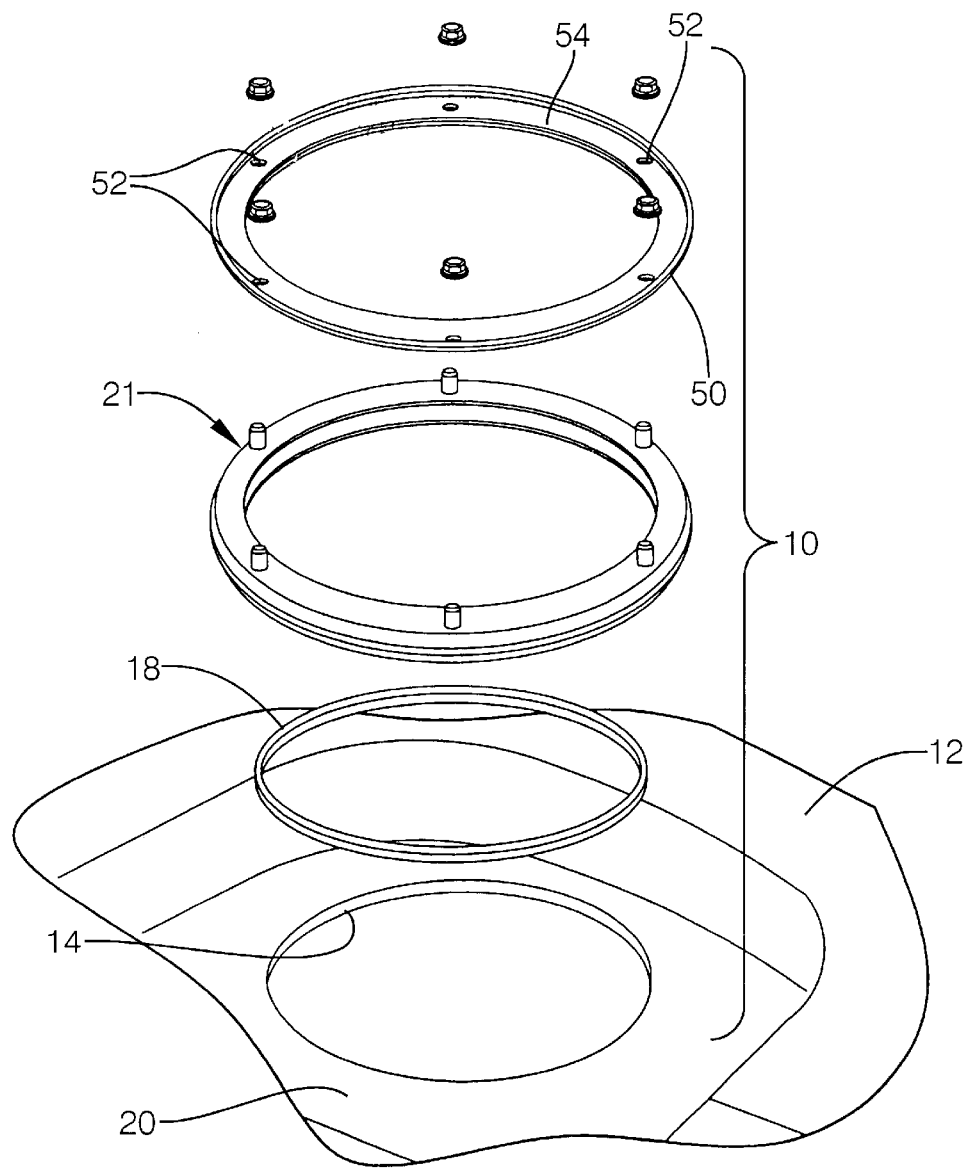
FIG. 3 is an exploded perspective view of the seal assembly of FIG. 1.
Figure 4:
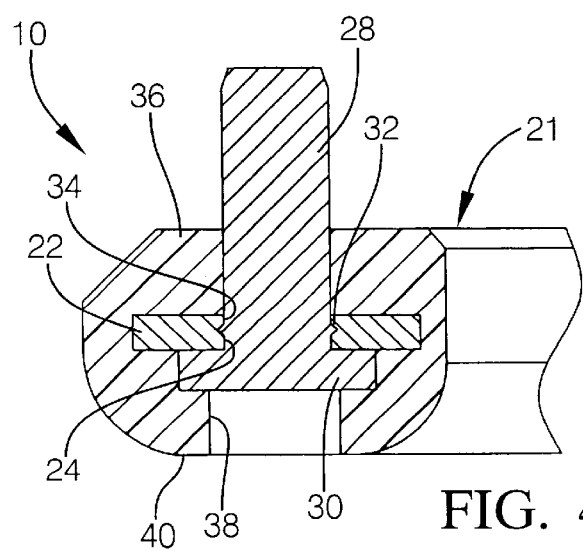
FIG. 4 is a fragmentary elevational view of a portion of the seal assembly of FIG. 1.
Figure 5:
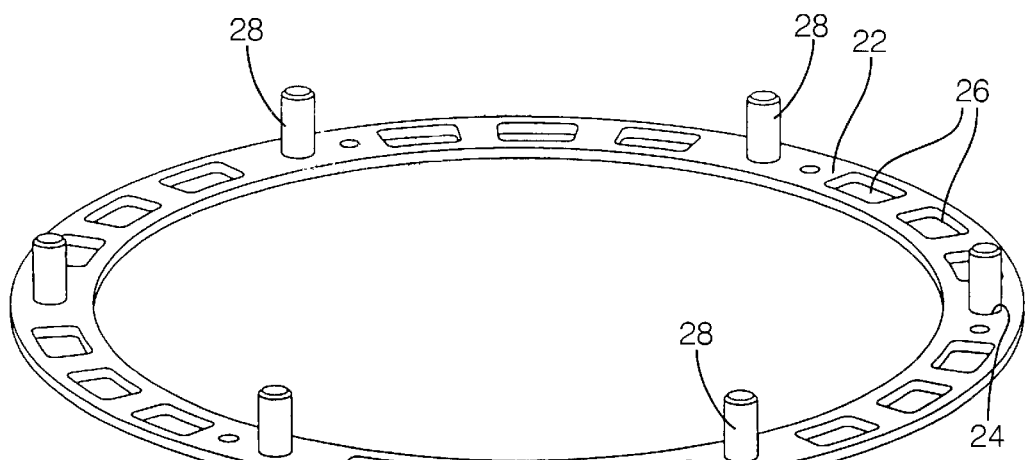
FIG. 5 is a perspective view of a portion of the seal assembly.

Referring to the drawings and in particular FIGS. 1 and 2, one embodiment of a seal assembly 10, according to the present invention, is shown for a fuel tank 12 in a vehicle (not shown). The fuel tank 12 includes a tank opening 14 therein. The tank opening 14 is generally circular in shape, but may have any suitable shape. The fuel tank 12 also includes a component 16 disposed in the tank opening 14 and extending inside the fuel tank 12. The component 16 may be any type normally associated with a fuel tank such as a fuel pump. The seal assembly 10 is used to create a seal between the component 16 and the fuel tank 12. The fuel tank 12 is made of a plastic material and formed by a twin sheet vacuum thermoforming process. It should be appreciated that, except for the seal assembly 10, the fuel tank 12 is conventional and known in the art.

Referring to FIGS. 1 through 5, the seal assembly 10 also includes a seal 18 such as a gasket disposed between the component 16 and a tank surface or top 20 of the fuel tank 12. The seal 18 is generally circular in shape and is made of a flexible material such as an elastomeric material. It should be appreciated that the seal 18 is conventional and known in the art.

The seal assembly 10 also includes an encapsulated studded ring assembly, generally indicated at 21, disposed about the tank opening 14 for attachment to the tank surface 20. The encapsulated studded ring assembly 21 includes a base ring 22 disposed about and spaced radially from the gasket 18. The base ring 22 is generally circular in shape and has a plurality of first apertures 24 extending therethrough and spaced circumferentially thereabout. The first apertures 24 are generally circular in shape. The base ring 22 may have a plurality of second apertures 26 extending therethrough and spaced circumferentially thereabout for a function to be described. The base ring 22 is made of a rigid material such as metal.

The encapsulated studded ring assembly 21 also includes a plurality of studs 28 extending through the first apertures 24 of the base ring 22. The studs 28 are generally cylindrical in shape and have a generally circular cross-sectional shape. The studs 28 have a generally annular head 30 extending radially outwardly at one end thereof and disposed adjacent the base ring 22. The studs 28 are secured to the base ring 22 by an annular flange 32 on the stud 28 extending into an annular groove 34 on the base ring 22. The studs 28 are made of a metal material and are threaded for a function to be described.

Referring to FIGS. 2 through 7, the encapsulated studded ring assembly 21 includes a support ring 36 encapsulating the base ring 22 and a portion of the studs 28. The support ring 36 is generally circular in shape and has a generally rectangular cross-section.

Figure 6:
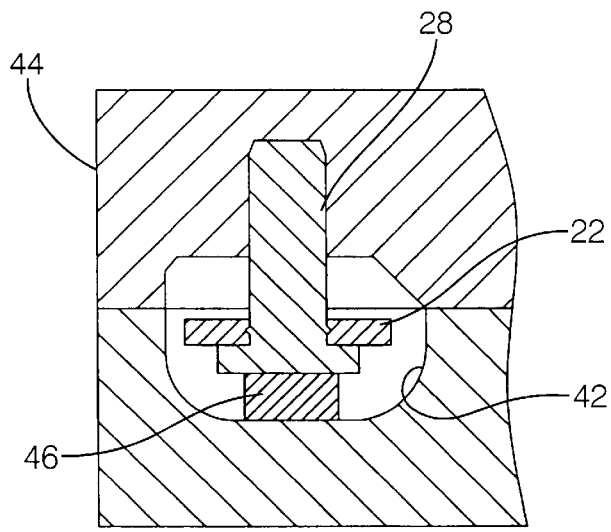
FIG. 6 is a fragmentary elevational view of the seal assembly of FIG. 1 prior to molding.
Figure 7:
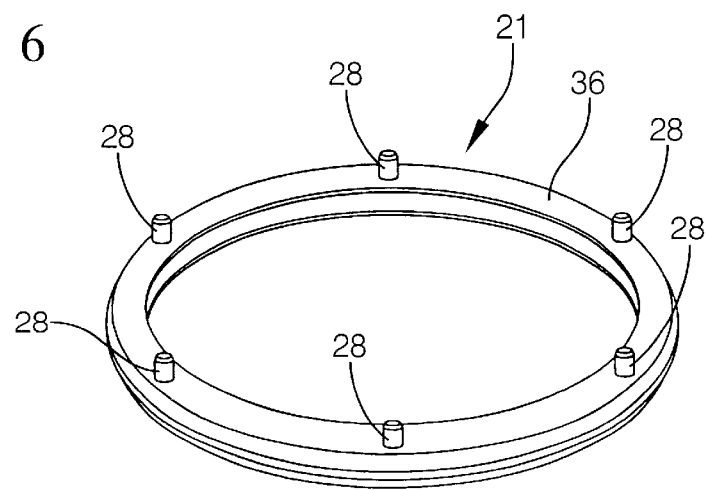
FIG. 7 is a perspective view of the seal assembly of FIG. 1 after molding and prior to assembly to the fuel tank.

The support ring 36 is made of a plastic material. The support ring 36 is formed about the base ring 22 and head 30 of the studs 28 with an aperture 38 extending from the head 30 to a bottom surface 40 of the support ring 36. As illustrated in FIG. 6, the studs 28 and base ring 22 are secured together via the flange 32 and groove 34 and disposed in a cavity 42 of a mold 44. An insert 46 is disposed between the head 46 and the mold 44. A plastic material is injected into the cavity 42 by conventional injection molding process to encapsulate the plastic material about the base ring 22 and a portion of the studs 28 to form the support ring 36. The plastic material also flows through the second apertures 26 when forming the support ring 36. The encapsulated studded ring assembly 21 if formed as a monolithic structure being integral and one-piece. Once formed, the encapsulated studded ring assembly 10 is removed from the mold 44 and subsequently a weld 48 is formed between the bottom surface 40 of the support ring 36 and the tank surface 20 by suitable means such as welding. It should be appreciated that the tank surface 20 is extended beyond the encapsulated studded ring assembly 21, putting that surface beyond the weld 48 and allowing the seal 18 to be sealed directly to the tank surface 20.

The seal assembly 10 further includes a locking ring 50 cooperating with the encapsulated studded ring assembly 21. The locking ring 50 is generally circular in shape. The locking ring 50 is made of a rigid material such as metal. The locking ring 50 has a plurality of apertures 52 extending therethrough and disposed circumferentially thereabout to receive the studs 28. The apertures 52 are generally circular in shape. The locking ring 50 also has a flange 54 extending radially inwardly and axially to engage component 16.

The seal assembly 10 further includes a plurality of fasteners such as nuts 56 threadably engaging the studs 28. The nuts 56 are threaded along the studs 28 to engage the locking ring 50. It should be appreciated that the nuts 56 are secured to the studs 28 to lock the locking ring 50 into position.

In operation, the seal assembly 10 is illustrated in an assembled state in FIG. 2. Once the encapsulated studded ring assembly 21 is formed and welded to the tank surface 20, the seal 18 is disposed about the tank opening 14 and the component 16 disposed in the tank opening 14, engaging the seal 18. The locking ring 50 is disposed adjacent the support ring 36 by extending the studs 28 through the apertures 52 therein. The nuts 56 are threaded onto the studs 28 and engage the locking ring 50 to compress the component 16 against the seal 18 and the seal 18 against the tank surface 20. It should be appreciated that the nuts 56 and locking ring 50 may be removed to remove the component 16 from the tank opening 14.

The present invention has been described in an 71 illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A fuel tank assembly comprising:

a plastic fuel tank to hold fuel therein having a tank opening;

a seal disposed between a component adapted to be disposed in said tank opening of said plastic fuel tank and an external tank surface of said plastic fuel tank;

studded ring assembly encapsulated by a plastic material, and said material being bonded to the tank surface about and outside of said tank opening such that said encapsulated studded ring assembly is entirely external of said tank; and a locking ring separate from the component and disposed about said tank opening and cooperating with said encapsulated studded ring assembly for engagement with the component and adapted to secure the component to said plastic fuel tank and adapted to seal said tank opening via said seal.

2. A fuel tank assembly as set forth in claim 1 including a plurality of fasteners engaging. said encapsulated studded ring assembly to secure said locking ring therebetween.

3. A fuel tank assembly as set forth in claim 1 wherein said encapsulated studded ring assembly comprises a base ring, a plurality of studs extending from said base ring and a support ring encapsulating said base ring.

4. A fuel tank assembly as set forth in claim 3 wherein base ring has a plurality of apertures extending therethrough.

5. A fuel tank assembly as set forth in claim 4 wherein each of said studs has a head extending radially and disposed adjacent said base ring, said studs extending through said apertures.

6. A fuel tank assembly as set forth in claim 5 wherein said support ring is disposed about said base ring and a portion of said studs.

7. A fuel tank assembly as set forth in claim 3 wherein said support ring is made of a plastic material.

8. A fuel tank assembly as set forth in claim 3 wherein said locking ring has a plurality of apertures extending therethough, said studs extending through said apertures.

9. A fuel tank assembly as set forth in claim 1 wherein said locking ring has a flange extending axially and adapted to engage the component.

10. A fuel tank assembly as set forth in claim 1 wherein said encapsulated studded ring assembly is welded to the tank surface.

11. A fuel tank assembly as set forth in claim 1 wherein said encapsulated studded ring assembly is a monolithic structure being integral and one-piece.

12. A fuel tank assembly comprising:
- a plastic fuel tank to hold fuel therein having a tank opening;
- a component disposed in said Lank opening of said plastic fuel tank;
- a seal disposed between said component and an oxternal tank surface of said plastic fuel tank;
- a studded ring assembly encapsulated by a plastic material, and said material being bonded to the tank surface about outside of said tank opening such that said encapsulated studded ring assembly is entirely external of said tank;
- a locking ring separate from said component and disposed about said tank opening and cooperating with said encapsulated studded line assembly for engaging said component, and
- a plurality of fasteners engaging said encapsulated studded ring assembly to secure said locking ring therebetween and to hold said component to said plastic fuel tank and to seal said tank opening via said seal.

13. A fuel tank assembly as set forth in claim 12 wherein said encapsulated studded ring assembly comprises a base ring, a plurality of studs extending from said base ring and a support ring encapsulating said base ring.

14. A fuel tank assembly as set forth in claim 13 wherein base ring has a plurality of apertures extending therethrough.

15. A fuel tank assembly as set forth in claim 14 wherein each of said studs has a head extending radially and disposed adjacent said base ring, said studs extending through said apertures.

16. A fuel tank assembly as set forth in claim 15 wherein said support ring is disposed about said base ring and a portion of said studs.

17. A fuel tank assembly as set forth in claim 13 wherein said locking ring has a plurality of apertures extending therethough, said studs extending through said apertures.

18. A fuel tank assembly as set forth in claim 17 wherein said locking ring has a flange extending axially to engage said component.

19. A fuel tank assembly as set forth in claim 13 wherein said support ring is welded to said tank surface.

20. A fuel tank assembly for a vehicle comprising:
- a plastic fuel tank to hold fuel therein to be used by an engine of a vehicle having a tank opening and an external tank surface surrounding said tank opening;
- component disposed in said tank opening and extending inside said fuel tank;
- a seal disposed between said component and said tank surface o[0086] said fuel tank;
- a studded ring assembly encapsulated by a plastic material, and said material being bonded to said tank surface about and outside of said tank opening such that said encapsulated studded ring assembly is entirely external of said tank; and
- a locking ring separate from the component and disposed about said tank opening and cooperating with said encapsulated studded ring assembly and engaging said component to secure said component to said fuel tank and to seal said tank opening via said seal.

* * * * *